(12) United States Patent
Tezuka

(10) Patent No.: US 11,055,047 B2
(45) Date of Patent: Jul. 6, 2021

(54) WAVEFORM DISPLAY DEVICE BASED ON WAVEFORM EXTRACTION

(71) Applicant: FANUC Corporation, Yamanashi (JP)

(72) Inventor: Junichi Tezuka, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/371,115

(22) Filed: Apr. 1, 2019

(65) Prior Publication Data
US 2019/0317715 A1    Oct. 17, 2019

(30) Foreign Application Priority Data
Apr. 16, 2018    (JP) .............................. JP2018-078243

(51) Int. Cl.
*G06F 3/14*    (2006.01)
*G06K 9/00*    (2006.01)

(52) U.S. Cl.
CPC ............. *G06F 3/14* (2013.01); *G06K 9/0053* (2013.01); *G06K 9/00536* (2013.01); *G06K 2209/19* (2013.01)

(58) Field of Classification Search
None
See application file for complete search history.

(56) References Cited

U.S. PATENT DOCUMENTS

| | | | |
|---|---|---|---|
| 2002/0123894 A1* | 9/2002 | Woodward | G10L 15/22 704/260 |
| 2007/0068910 A1 | 3/2007 | Ikeda et al. | |
| 2007/0168750 A1 | 7/2007 | Wheeler et al. | |

(Continued)

FOREIGN PATENT DOCUMENTS

| | | |
|---|---|---|
| JP | 2006-26640 A | 2/2006 |
| JP | 2010-92405 A | 4/2010 |

(Continued)

OTHER PUBLICATIONS

Cheng et al, 'CPS Modeling of CNC Machine Tool Work Processes Using an Instruction-Domain Based Approach', Engineering, pp. 247-260. (Year: 2015).*

*Primary Examiner* — Patrick F Valdez
(74) *Attorney, Agent, or Firm* — Hauptman Ham, LLP

(57) ABSTRACT

The waveform display device of the present invention is provided with a waveform pattern storage unit configured to store, in an associated manner, a control command and a waveform pattern of time-series data measured when the manufacturing machine is controlled by the control command, a waveform analysis unit configured to extract a characteristic waveform from the time-series data and identify the control command corresponding to the characteristic waveform with reference to the waveform pattern storage unit, a correspondence analysis unit configured to identify the correspondence between the characteristic waveform and a command included in the control program, based on the control program and the control command corresponding to the characteristic waveform, and a display unit configured to perform display such that the correspondence between the characteristic waveform and the command included in the control program is ascertainable.

3 Claims, 6 Drawing Sheets

(56) References Cited

U.S. PATENT DOCUMENTS

| | | | |
|---|---|---|---|
| 2009/0228135 A1* | 9/2009 | Nakamura | G05B 19/409 700/173 |
| 2010/0076990 A1* | 3/2010 | Akamine | G06K 9/00536 707/758 |
| 2011/0167391 A1* | 7/2011 | Momeyer | G06F 3/038 715/863 |
| 2015/0066434 A1 | 3/2015 | Ogawa | |
| 2016/0307568 A1* | 10/2016 | Zhao | B60W 50/08 |
| 2017/0285600 A1 | 10/2017 | Tezuka | |

FOREIGN PATENT DOCUMENTS

| | | | |
|---|---|---|---|
| JP | 2010092405 A | * | 4/2010 |
| JP | 2013-37383 A | | 2/2013 |
| JP | 2015-52846 A | | 3/2015 |
| JP | 2017-182475 A | | 10/2017 |
| WO | 2011/074518 A1 | | 6/2011 |

* cited by examiner

FIG.4

・WAVEFORM PATTERN ON MACHINING TYPE INCLUDING RIGID TAP MACHINING

WAVEFORM PATTERN OF SPINDLE SPEED

| CONTROL COMMAND | WAVEFORM PATTERN |
|---|---|
| ⋮ | ⋮ |
| G86 | WAVEFORM PATTERN A-10 |
| ⋮ | ⋮ |
| M29 | WAVEFORM PATTERN A-34 |
| ⋮ | ⋮ |

WAVEFORM PATTERN OF Z-AXIS POSITION

| CONTROL COMMAND | WAVEFORM PATTERN |
|---|---|
| ⋮ | ⋮ |
| G86 | WAVEFORM PATTERN B-10 |
| ⋮ | ⋮ |
| M29 | WAVEFORM PATTERN B-34 |
| ⋮ | ⋮ |

⋮

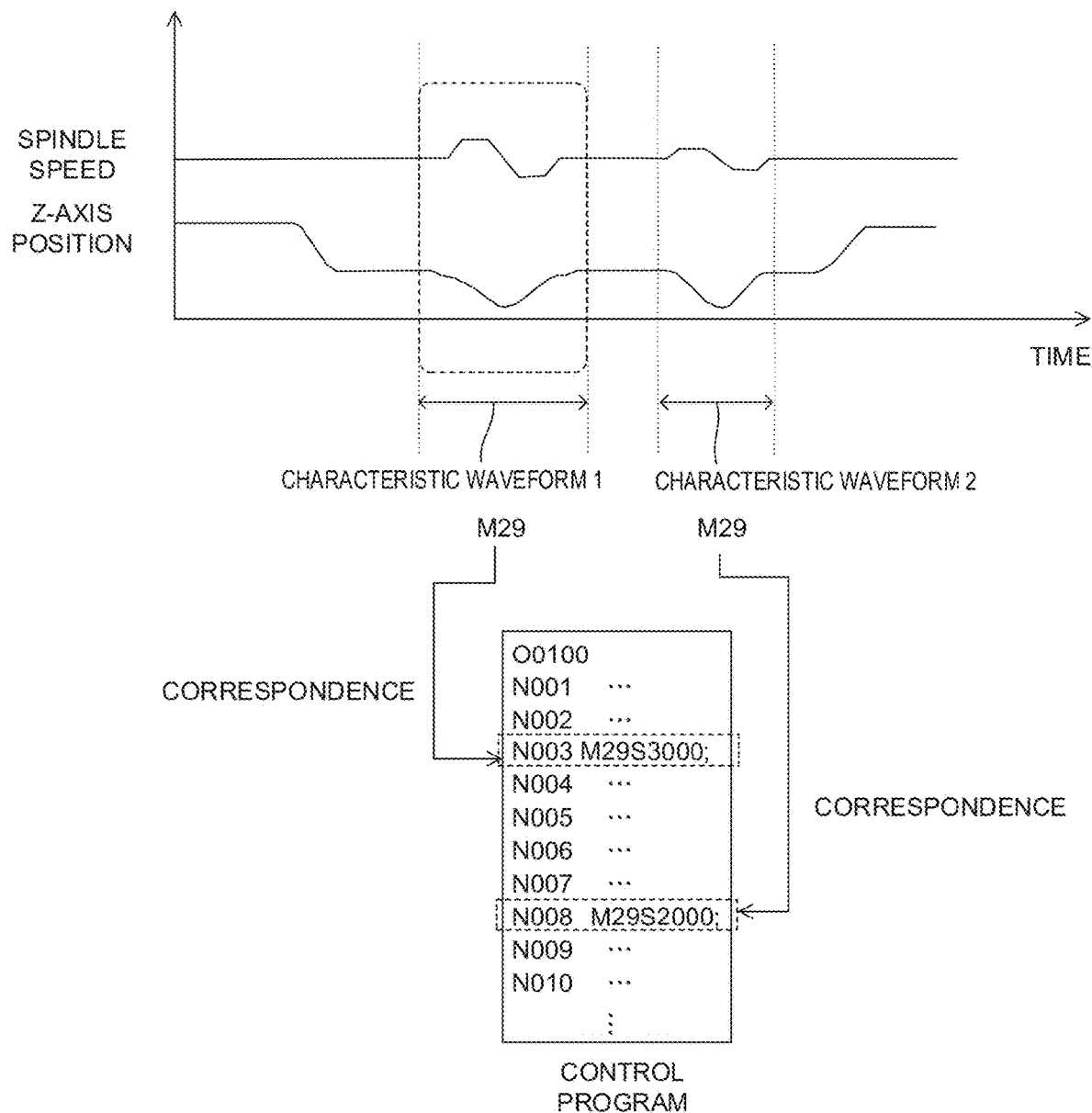

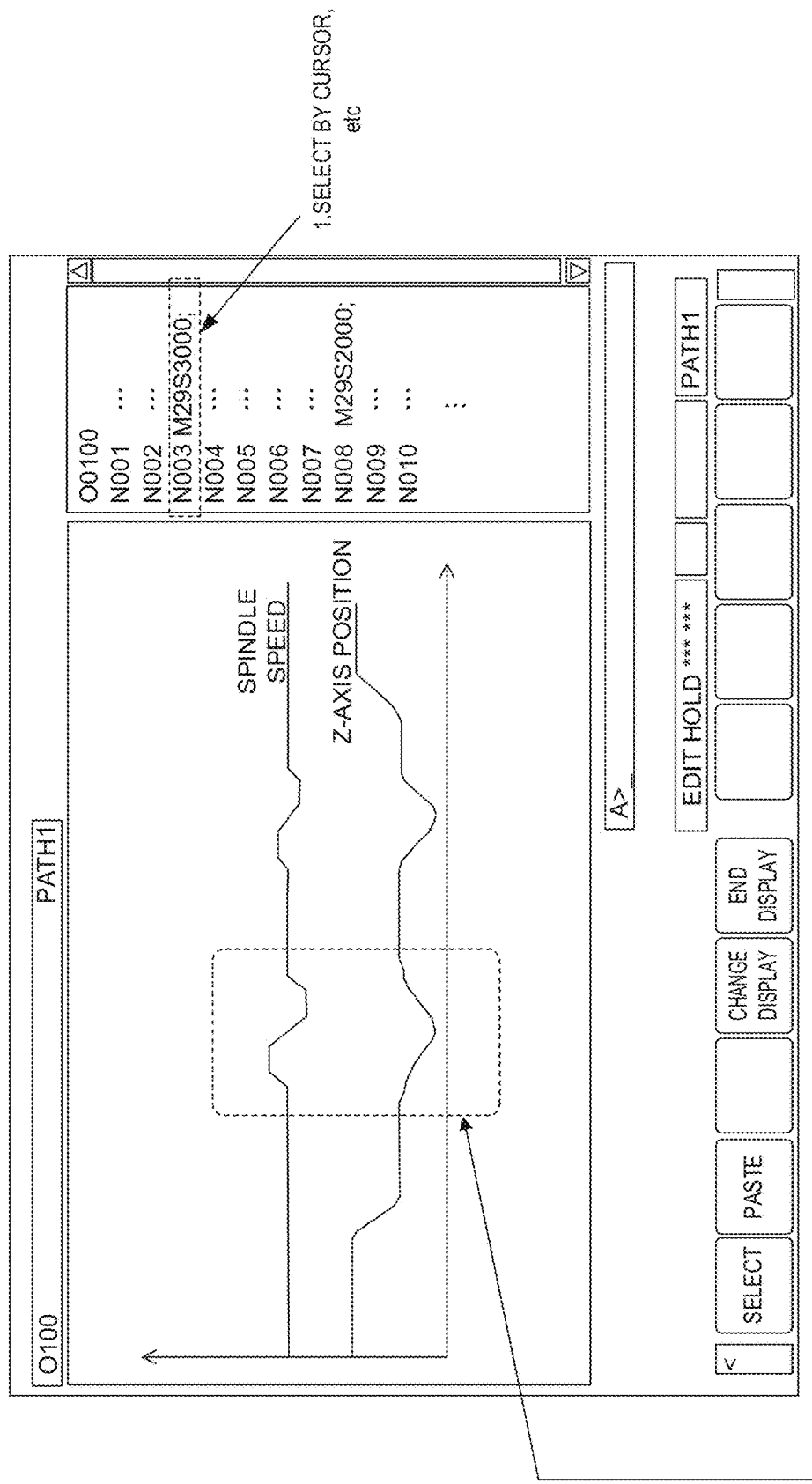

WAVEFORM DISPLAY DEVICE BASED ON WAVEFORM EXTRACTION

RELATED APPLICATIONS

The present application claims priority to Japanese Patent Application Number 2018-078243 filed Apr. 16, 2018, the disclosure of which is hereby incorporated by reference herein in its entirety.

BACKGROUND OF THE INVENTION

Field of the Invention

The present invention relates to a waveform display device, and more particularly, to a waveform display device configured to analyze the relationship between commands in a control program and waveform data indicative of physical quantities acquired from a manufacturing machine.

Description of the Related Art

In some cases, the contents of an operation of a manufacturing machine, such as a robot or a machine tool, may be analyzed based on time-series data on physical quantities such as axis positions, axis speeds and torques, measured during the operation, and a control program used for the operation may be improved based on the results of the analysis. In these cases, it is necessary to associate individual portions of the time-series data with their corresponding execution points in the control program. This association work generally used to be performed by an experienced worker observing the shape of a waveform of the time-series data. Moreover, the association work used to be performed as the execution points and acquired physical quantities are successively correlated with one another and recorded during the execution of the control program (e.g., Japanese Patent Applications Laid-Open Nos. 2013-037383 and 2010-092405).

If techniques such as those disclosed in Japanese Patent Applications Laid-Open Nos. 2013-037383 and 2010-092405 are used, however, the execution environment of the control program and a structure for acquiring the physical quantities should be previously correlated in some manner (e.g., in such a manner that a timer used in the program execution environment is synchronized with a clock built in a physical quantity detector). The execution points in the control program cannot be associated with physical quantities measured by means of sensors that are not correlated with the program execution environment. Therefore, if the execution environment of the control program and the structure for acquiring the physical quantities are not correlated in advance, it is necessary to associate the physical quantities and the execution points in the control program by a method different from that disclosed in the above-described documents. Moreover, when the worker performs the association work, it is difficult for him/her to understand, from waveform data on the spindle positions and speeds and feed axis positions and speeds, the correspondence between these waveform data and the execution points in the control program. There is a problem that this work is difficult for an inexperienced worker, in particular.

Accordingly, the object of the present invention is to provide a waveform display device capable of easily analyzing the relationship between commands in a control program and waveform data indicative of time-series changes of physical quantities acquired from a manufacturing machine.

SUMMARY OF THE INVENTION

A waveform display device of the present invention solves the above problems by previously learning characteristic waveform patterns attributable to the type of machine operation and automatically displaying execution points in a control program corresponding to the waveform patterns.

One aspect of the present invention is a waveform display device, which is configured to display the correspondence between a control program for controlling a manufacturing machine and a characteristic waveform included in time-series data on a physical quantity to be measured when the manufacturing machine is controlled based on the control program, and comprises a waveform pattern storage unit configured to store, in an associated manner, a control command and a waveform pattern of the time-series data measured when the manufacturing machine is controlled by the control command, a waveform analysis unit configured to extract the characteristic waveform from the time-series data on the physical quantity to be measured when the manufacturing machine is controlled based on the control program and identify the control command corresponding to the characteristic waveform with reference to the waveform pattern storage unit, a correspondence analysis unit configured to identify the correspondence between the characteristic waveform and a command included in the control program, based on the control program and the control command corresponding to the characteristic waveform identified by the waveform analysis unit, and a display unit configured to perform display such that the correspondence between the characteristic waveform and the command included in the control program, which is identified by the correspondence analysis unit, is ascertainable.

According to the present invention, a worker can easily ascertain the correspondence between a physical quantity and a control program and therefore efficiently analyze the waveform of the physical quantity.

BRIEF DESCRIPTION OF THE DRAWINGS

The above and other objects and features of the present invention will be obvious from the following description of embodiments with reference to the accompanying drawings, in which:

FIG. 4 is a diagram showing an example in which control commands and waveform patterns are stored in association with one another;

FIG. 5 is a diagram illustrating the correspondence between the characteristic waveforms and commands in a control program; and FIG. 6 is a diagram showing an example of display of the correspondence between the characteristic waveforms and the commands in the control program.

DETAILED DESCRIPTION OF THE PREFERRED EMBODIMENTS

An embodiment of the present invention will now be described with reference to the accompanying drawings.

Figure 1:
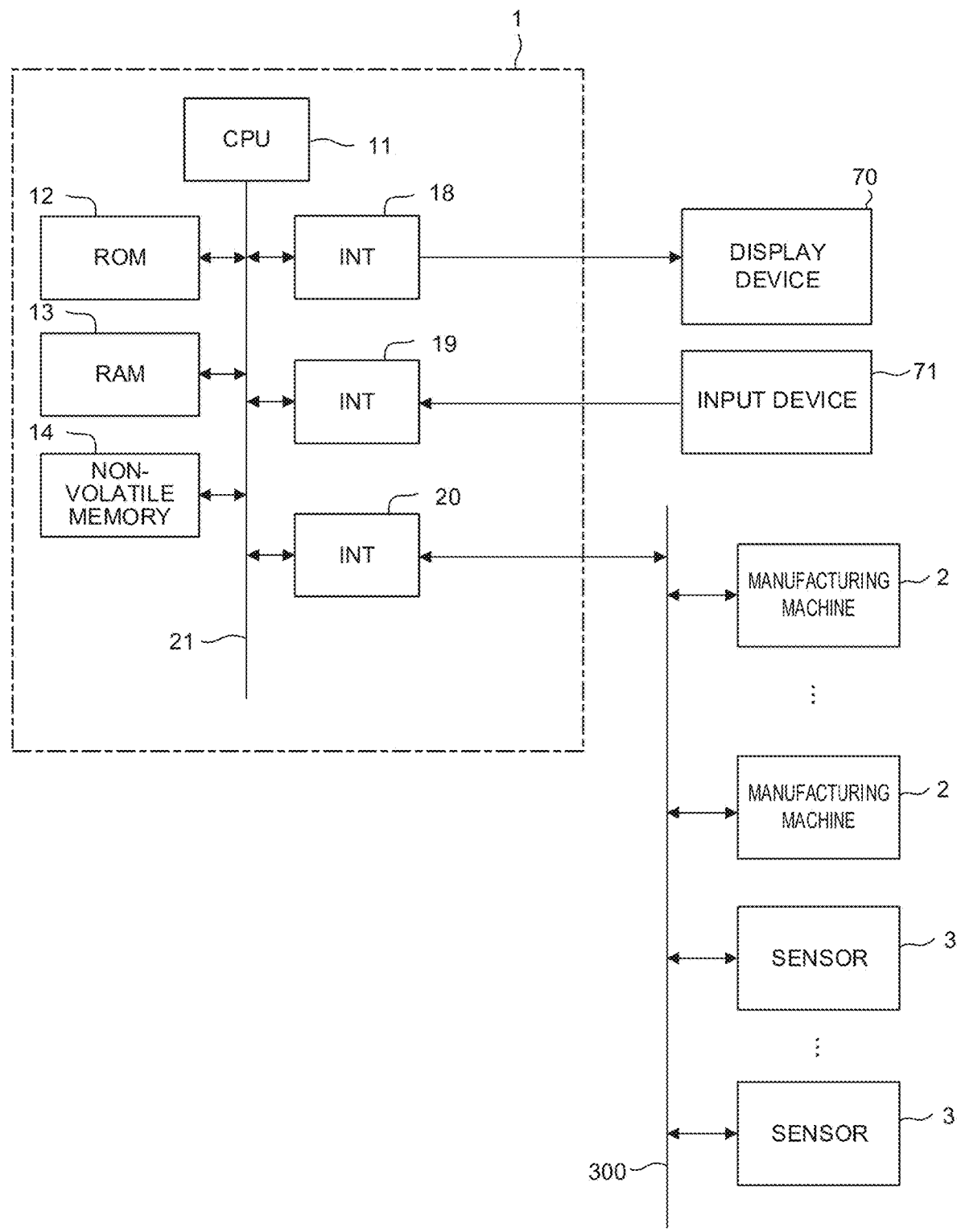
FIG. 1 is a schematic hardware configuration diagram of a waveform display device according to one embodiment.

FIG. 1 is a schematic hardware configuration diagram showing a waveform display device according to one embodiment of the present invention. A waveform display device 1 of the present embodiment is mounted on a control device for controlling manufacturing machines. Moreover, the waveform display device 1 may be mounted on a personal computer adjoined to the control device for controlling the manufacturing machines or a computer, such as a cell computer, host computer, or cloud server, connected to the control device through a network. FIG. 1 shows an example of a case where the waveform display device 1 is mounted on the computer connected to the control device for controlling the manufacturing machines through the network.

A CPU (Central Processing Unit) 11 of the waveform display device 1 according to the present embodiment is a processor for generally controlling the waveform display device 1. The CPU 11 reads out a system program stored in a ROM (Read Only Memory) 12 via a bus 21 and controls the entire waveform display device 1 according to the system program. A RAM (Random Access Memory) 13 is loaded with temporary calculation data, display data displayed on a display device 70, and various data input by an operator through an input device 71. The data stored in the RAM 13 is sent to the display device 70 through an interface 18. Moreover, the various data input by the operator are sent to the RAM 13 through an interface 19.

An SRAM (Static Random Access Memory) or the like that is backed up by a battery (not shown) or an SSD (Solid State Drive) or the like is used for the non-volatile memory 14, for example. Thus, the non-volatile memory 14 is a memory whose storage state can be maintained even when the waveform display device 1 is powered off. The non-volatile memory 14 is stored with data and programs input through the input device 71 and data acquired from manufacturing machines 2, off-line (through external devices (not shown)) or on-line (through a network 300 connected to an interface 20). Moreover, the non-volatile memory 14 is stored with data acquired from sensors 3, such as length measuring devices and imaging devices, off-line (through external devices (not shown)) or on-line (through the network 300 connected to the interface 20). The data, programs, and the like stored in the non-volatile memory 14 may be loaded in the RAM 13 during use. Furthermore, various algorithms required for analysis of time-series data and system programs for performing other necessary processing are previously written in the ROM 12.

Figure 2:
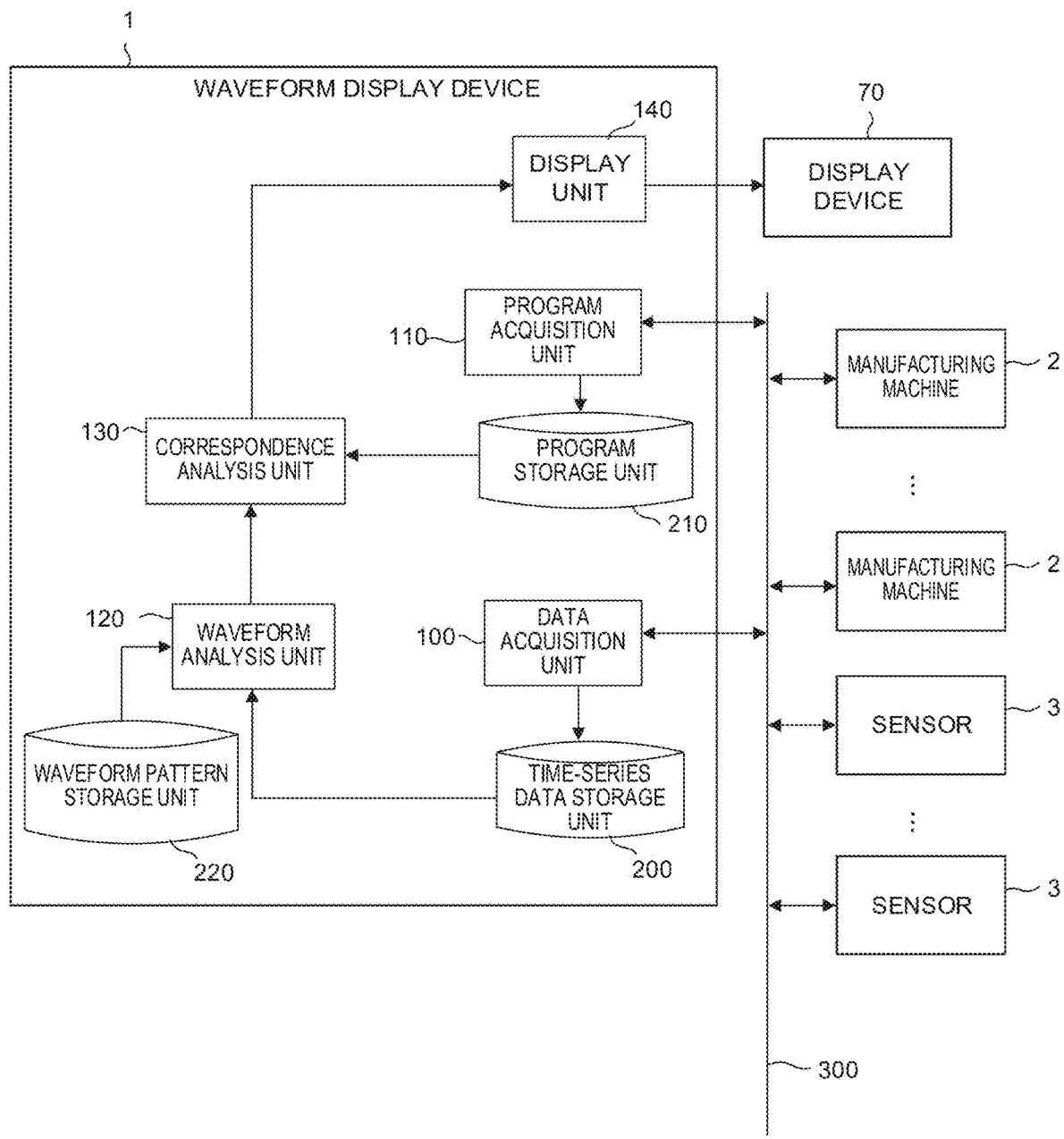
FIG. 2 is a schematic functional block diagram of the waveform display device according to the one embodiment.

FIG. 2 is a schematic functional block diagram of the waveform display device 1 according to the one embodiment of the present invention. Each of functional blocks shown in FIG. 2 is implemented as the CPU 11 of the waveform display device 1 shown in FIG. 1 executes the system program and controls operations of the individual parts of the waveform display device 1.

The waveform display device 1 of the present embodiment comprises a data acquisition unit 100, program acquisition unit 110, waveform analysis unit 120, correspondence analysis unit 130, and display unit 140. Also, a time-series data storage unit 200, program storage unit 210, and waveform pattern storage unit 220 are secured on the non-volatile memory 14. The time-series data storage unit 200 stores time-series data. The program storage unit 210 stores a control program. The waveform pattern storage unit 220 stores the relationship between control commands and preset waveform patterns of the time-series data.

The data acquisition unit 100 is a functional means for causing the time-series data storage unit 200 to store the data acquired from the manufacturing machines 2 and the data detected by the sensors 3, such as the length measuring devices and the imaging devices, as the time-series data. The data acquisition unit 100 generates the time-series data by arranging the acquired data in a time series, based on time data, such as an RTC (real time clock) (not shown) built in the waveform display device 1, for example. The data acquisition unit 100 causes the time-series data storage unit 200 to store the generated individual time-series data. Moreover, the data acquisition unit 100 may be configured to cause the time-series data storage unit 200 to directly store externally created time-series data. Data to be acquired by the data acquisition unit 100 include, for example, the position, speed torque commands and current and voltage values of a motor for the manufacturing machines 2, the internal pressure of the manufacturing machines 2, and data such as environmental sounds. If the waveform display device 1 performs processing based on the data acquired off-line, the time-series data are stored directly into the time-series data storage unit 200 from, for example, an external device, so that the data acquisition unit 100 is not always essential.

The program acquisition unit 110 is a functional means for causing the program storage unit 210 to store the control program acquired from the manufacturing machines 2. If the manufacturing machines 2 are machine tools, for example, the control program acquired by the program acquisition unit 110 is a machining program used in machining workpieces by the machine tools. Moreover, if the manufacturing machines 2 are robots, the control program acquired by the program acquisition unit 110 is a program for controlling the operation of the robots. If the waveform display device 1 performs processing based on the machining program acquired off-line, the control program is stored directly into the program storage unit 210 from, for example, an external device, so that the program acquisition unit 110 is not always essential.

The waveform analysis unit 120 is a functional means for analyzing the waveform of the time-series data stored in the time-series data storage unit 200. The waveform analysis unit 120 extracts a characteristic waveform from the time-series data stored in the time-series data storage unit 200 and performs matching between the extracted characteristic waveform and a characteristic waveform pattern previously stored in the waveform pattern storage unit 220. Based on the results of the matching, the waveform analysis unit 120 identifies a control command corresponding to the characteristic waveform.

Figure 3A:
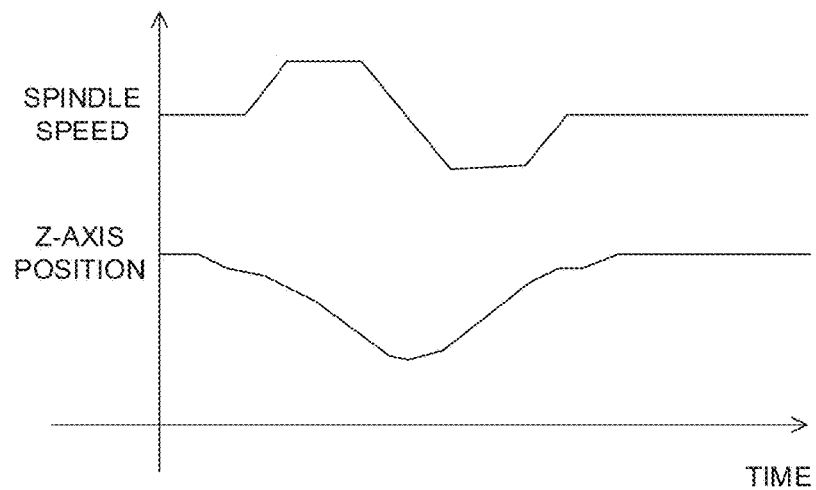
FIG. 3A is a diagram illustrating characteristic waveforms extracted from time-series data.
Figure 3B:
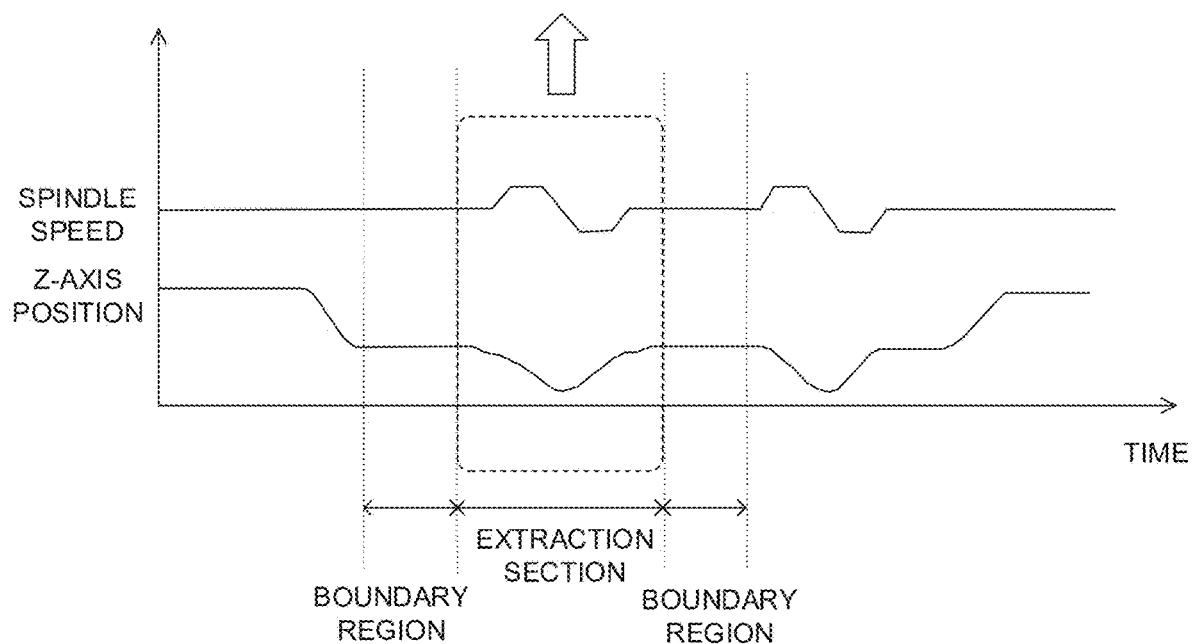
FIG. 3B is a diagram illustrating the characteristic waveforms extracted from the time-series data.

FIGS. 3A and 3B are diagrams showing examples of the characteristic waveform extracted from the time-series data by the waveform analysis unit 120. FIG. 3B shows a graph representing time-series data on the spindle speed and the Z-axis position for rigid tap machining (control command: M29). FIG. 3A shows an enlarged version of the characteristic waveform in the graph of the time-series data shown in FIG. 3B. As shown in FIG. 3B, for example, the waveform analysis unit 120 may be configured to extract, as the characteristic waveform, a section (extraction section) defined by boundary regions corresponding to preset specified periods during which there is no change in the values, among the time-series data. The waveform analysis unit 120 performs processing using a known method such as DP matching or the like between the extracted characteristic waveform and the waveform pattern, which is associated with the control command and stored in the waveform pattern storage unit 220. In this way, the waveform analysis unit 120 can identify the control command for the operation on which the extracted characteristic waveform is based. As illustrated in FIG. 4, the waveform pattern storage unit 220 is previously stored, for each type of machining by the manufacturing machines 2, with a control command and the waveform pattern of time-series data measured when the control command is executed (or data indicative of the characteristics of the waveform pattern, MFCC (Mel-Frequency Cepstrum Coefficients), etc.) in association with each other. Moreover, the waveform pattern storage unit 220 is stored with data in which the control command and the waveform pattern are associated for each kind of time-series data, such as the spindle speed and the Z-axis position, during the machining corresponding to the type of machining by the manufacturing machines. The waveform analysis unit 120 analyzes the time-series data by reading out data related to an appropriate waveform pattern from the waveform pattern storage unit 220, in accordance with the type of machining having been being performed during the measurement of the time-series data and the kind of the time-series data from which the characteristic waveform is extracted.

The waveform analysis unit 120 may be composed of a conventional machine learning device. If the machine learning device is used, the waveform analysis unit 120 is constructed as a machine learning device configured to perform supervised learning. The waveform analysis unit 120 performs the supervised learning based on teacher data, which include time-series data measured during the operation by each control command (or data indicative of features of the time-series data, MFCC (Mel-Frequency Cepstrum Coefficients), etc.) as input data and the control command as output data. In this case, individual waveform patterns are stored as machine learning device models into the waveform pattern storage unit 220. On receiving an input of the characteristic waveform extracted from the time-series data, the waveform analysis unit 120 performs estimation processing using a pre-trained model stored in the waveform pattern storage unit 220 and outputs a control command corresponding to the waveform. If the waveform analysis unit 120 is composed of the machine learning device, the pre-trained model is previously constructed for each kind of time-series data for each individual type of machining. The waveform analysis unit 120 analyzes the time-series data by reading out an appropriate pre-trained model in accordance with the type of machining having been being performed during the measurement of the time-series data and the kind of the time-series data from which the characteristic waveform is extracted. For example, a multi-layer neural network can be used as the machine learning device that constitutes the waveform analysis unit 120. Moreover, the machine learning device constituting the waveform analysis unit 120 may be composed of a recurrent neural network or the like that can easily handle the time-series data.

The waveform analysis unit 120 performs matching between characteristic waveforms in the same time zone extracted from each of a plurality of time-series data (e.g., time-series data including the spindle speed and the Z-axis position) and the waveform pattern read out from the waveform pattern storage unit 220 for each kind of time-series data. Based on the results of the matching, the waveform analysis unit 120 identifies control commands corresponding to the characteristic waveforms. If the control commands identified based on the characteristic waveforms extracted from the individual time-series data are different from one another, the control command corresponding to the characteristic waveform can be identified with high accuracy by using, for example, the majority logic or such a method as to select the control command with high reliability (score) calculated by each matching algorithm.

The correspondence analysis unit 130 is a functional means for identifying and outputting the correspondence between the characteristic waveform and each command in the control program, based on the control commands corresponding to the individual characteristic waveforms extracted from the time-series data by the waveform analysis unit 120. The correspondence analysis unit 130 arranges the control commands identified by the waveform analysis unit 120 in the time order of the characteristic waveforms corresponding to the individual control commands, in the time-series data, and identifies the correspondence so that the control commands arranged in the time order and the order of appearance of the commands in the control program are consistent. As illustrated in FIG. 5, for example, if two characteristic waveforms 1 and 2 are extracted from the time-series data and if it is identified by the waveform analysis unit 120 that the individual characteristic waveforms 1 and 2 correspond to the control commands M29 (rigid tap machining), the correspondence analysis unit 130 retrieves the commands M29 from the control program and associates one of the two retrieved commands M29 which is located ahead with the characteristic waveform 1 and the other one located behind with the characteristic waveform 2.

If the correspondence between the control commands arranged in the time order and the order of appearance of the commands in the control program cannot be identified, the correspondence analysis unit 130 outputs information suggestive of the possibility of correspondence. If the command M29 exists in a block N012 (not shown) of the control program in FIG. 5, for example, the possibility of correspondence is output on the assumption that the characteristic waveform 1 corresponds to the command M29 of N003 or N008 and that the characteristic waveform 2 corresponds to the command M29 of N008 or N012. Moreover, if the command M29 does not exist in the block N008 of the control program in FIG. 5, that is, if the command M29 included in the control program exists only in N003, the possibility of correspondence is output on the assumption that the characteristic waveform 1 or 2 corresponds to the command M29 of N003.

The display unit 140 is a functional means for displaying the correspondence between the characteristic waveform identified by the correspondence analysis unit 130 and each command in the control program on the display device 70. As illustrated in FIG. 6, for example, the display unit 140 displays the time-series data and the machining program on one and the same screen. Moreover, the display unit 140 may be configured to perform display such that a part of the characteristic waveform of the time-series data corresponding to a selected command, if any, in the machining program can be ascertained by a worker. Moreover, the display unit 140 may be configured to display the block No. of the corresponding command in the control program near each characteristic waveform included in the time-series data. Furthermore, the display unit 140 may be configured to display the command included in the control program and the characteristic waveform of the time-series data by any method only if their correspondence can be ascertained.

If the correspondence analysis unit 130 outputs the possibility of correspondence, the display unit 140 displays the possibility of correspondence so that it can be ascertained that there is the possibility of any of a plurality of control program commands corresponding to the characteristic waveform or the possibility of any of a plurality of characteristic waveforms corresponding to the control program command. For example, if two characteristic waveforms measured when the command M29 is executed are included in the time-series data and if only one command M29 is included in the control program, it is necessary only that the two characteristic waveforms be displayed flashing and a message or the like that there is the possibility of the two characteristic waveforms corresponding to the command M29 may be displayed.

While an embodiment of the present invention has been described above, the invention is not limited to the above-described embodiment and may be suitably modified and embodied in various forms.

The invention claimed is:

1. A waveform display device, comprising:
a waveform pattern storage unit configured to store, in an associated manner, a plurality of control commands and a plurality of waveform patterns of time-series data measured when a manufacturing machine is controlled by a control program including the plurality of control commands, wherein the plurality of waveform patterns of time-series data includes waveform patterns of at least two parameters at each time in a time series;
a processor configured to
extract characteristic waveforms from the plurality of waveform patterns of time-series data on a physical quantity to be measured when the manufacturing machine is controlled based on the control program,
determine, among the plurality of control commands, control commands corresponding to the extracted characteristic waveforms with reference to the waveform pattern storage unit,
arrange the determined control commands in a time order of the extracted characteristic waveforms, and
identify a correspondence between the extracted characteristic waveforms and commands included in the control program, based on the control program and the determined control commands corresponding to the extracted characteristic waveforms to cause an order of appearance of the commands included in the control program to be consistent with the time order of the extracted characteristic waveforms; and
a display unit configured to perform display the extracted characteristic waveforms and the plurality of control commands included in the control program such that the correspondence between the extracted characteristic waveforms and the plurality of control commands included in the control program, which is identified by the processor, is ascertainable.

2. The waveform display device according to claim 1, wherein,
in response to no correspondence being identifiable between the order of appearance of the commands included in the control program and the time order of the extracted characteristic waveforms,
the processor is configured to output information suggestive of possibility of the correspondence between the order of appearance of the control commands and the time order of the extracted characteristic waveforms, and
the display unit is configured to display the possibility of the correspondence between the order of appearance of the control commands and the time order of the extracted characteristic waveforms.

3. The waveform display device according to claim 1, wherein the processor is configured to
perform a supervised learning based on teacher data, said teacher data including the time-series data as input data and the plurality of control commands as output data to generate a trained model, and
determine, using the trained model, the control commands corresponding to the extracted characteristic waveforms from the plurality of control commands.

* * * * *